(12) United States Patent
Tsuruya et al.

(10) Patent No.: US 11,755,249 B2
(45) Date of Patent: Sep. 12, 2023

(54) STORAGE SYSTEM INCLUDING STORAGE NODES TO DETERMINE CACHE ALLOCATIONS TO IMPLEMENT CACHE CONTROL

(71) Applicant: Hitachi, Ltd., Tokyo (JP)

(72) Inventors: Masahiro Tsuruya, Tokyo (JP); Tomohiro Yoshihara, Tokyo (JP); Ryosuke Tatsumi, Tokyo (JP); Shinsuke Izawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/731,626

(22) Filed: Apr. 28, 2022

(65) Prior Publication Data

US 2022/0253250 A1    Aug. 11, 2022

Related U.S. Application Data

(63) Continuation of application No. 16/551,778, filed on Aug. 27, 2019, now Pat. No. 11,347,432.

(30) Foreign Application Priority Data

Feb. 27, 2019  (JP) .................................. 2019-033920

(51) Int. Cl.
*G06F 3/06* (2006.01)
*G06F 12/0895* (2016.01)

(52) U.S. Cl.
CPC ............ *G06F 3/0659* (2013.01); *G06F 3/067* (2013.01); *G06F 3/0613* (2013.01); *G06F 3/0656* (2013.01); *G06F 12/0895* (2013.01); *G06F 2212/305* (2013.01)

(58) Field of Classification Search
CPC .. G06F 3/0659; G06F 12/0895; G06F 3/0656; G06F 3/0613; G06F 3/067; G06F 2212/305
See application file for complete search history.

(56) References Cited

U.S. PATENT DOCUMENTS

| | | |
|---|---|---|
| 2002/0101677 A1 | 8/2002 | Dykes |
| 2015/0178213 A1 | 6/2015 | Jia |
| 2017/0013057 A1* | 1/2017 | Shani ..................... G06F 3/065 |
| 2017/0196117 A1 | 7/2017 | Smit et al. |
| 2018/0246668 A1 | 8/2018 | Sakashita et al. |

FOREIGN PATENT DOCUMENTS

| | | |
|---|---|---|
| JP | 2017-524248 A | 8/2017 |
| WO | 2016/005065 A1 | 1/2016 |
| WO | 2017/061008 A1 | 4/2017 |

OTHER PUBLICATIONS

Japanese Office Action received in corresponding Japanese Application No. 2019-033920 dated Jan. 5, 2021.

* cited by examiner

*Primary Examiner* — Mark A Giardino, Jr.
(74) *Attorney, Agent, or Firm* — MATTINGLY & MALUR, PC

(57) ABSTRACT

To improve performance of a storage system. The storage system includes a plurality of storage nodes that communicate via a network. Each of the plurality of storage nodes includes one or more controllers. At least one controller in the controllers specifies at least two controllers that allocate a cache sub-area where write data is stored based on a controller that receives the write data from a host and a controller that processes the write date, and the cache sub-area is allocated in the specified controllers.

6 Claims, 17 Drawing Sheets

FIG. 5

| PDEV # | CAPACITY | STATE | CONNECTED CTL # |
|---|---|---|---|
| 1 | 1000 GB | NORMAL | 1,2 |
| 2 | 1000 GB | NORMAL | 1,2 |
| ... | ... | ... | ... |
| X | xxx GB | ABNORMAL | Y,Z |
| ... | ... | ... | ... |

PDEV MANAGEMENT TABLE

FIG. 6

| LDEV # | CAPACITY | STATE | REDUNDANCY CONFIGURATION | CONFIGURATION INFORMATION |
|---|---|---|---|---|
| 1 | 3000 GB | NORMAL | 1 PARITY | PDEV#1,2,3,4 |
| 2 | 6000 GB | NORMAL | 2 PARITY | PDEV#5,6,7,8,9,10 |
| ... | ... | ... | ... | ... |
| X | 1000 GB | NORMAL | 1 PARITY REDUNDANCY BETWEEN STORAGES | PDEV # A, B, C STORAGE Z-LEDV # 101 |
| ... | ... | ... | ... | ... |

LDEV MANAGEMENT TABLE

| SEGMENT # (0701) | CTL # (0702) | STATE (0703) |
|---|---|---|
| 1 | 1 | LOCKED |
| 2 | 1 | LOCKED |
| ... | ... | ... |
| X | - | FREE |
| ... | ... | ... |

BUFFER SEGMENT MANAGEMENT TABLE

FIG. 8

| SEGMENT # | LDEV # | SEGMENT # IN LDEV | CTL # | STATE | ATTRIBUTE |
|---|---|---|---|---|---|
| 1 | 1 | 101 | 1 | CLEAN | FRONT SURFACE |
| 2 | 5 | 84 | 1 | DIRTY | SUB-SURFACE |
| ... | ... | ... | ... | ... | ... |
| X | - | - | - | FREE | - |
| ... | ... | ... | ... | ... | ... |

CACHE SEGMENT MANAGEMENT TABLE

STORAGE SYSTEM INCLUDING STORAGE NODES TO DETERMINE CACHE ALLOCATIONS TO IMPLEMENT CACHE CONTROL

CLAIM OF PRIORITY

The present application claims priority from Japanese patent application JP2019-033920 filed on Feb. 27, 2019, the content of which is hereby incorporated by reference into this application.

BACKGROUND OF THE INVENTION

1. Field of the Invention

The present invention relates to a storage system including a plurality of storage nodes.

2. Description of the Related Art

In recent years, since a huge amount of data represented by Internet of Things (IoT) and Artificial Intelligence (AI) is accumulated and analyzed, the importance of techniques that generate new value increases. A storage system that has not only a capacity capable of accumulating a huge amount of data but also high input and output (I/O) performance to analyze the accumulated data is required in these techniques.

On the other hand, in order to control an introduction cost in the introduction of the storage system, it is desirable to introduce a system with a small configuration in an initial stage of the introduction and expand the system with the expansion of business. A scale-out storage system is one way to realize the above. In the scale-out storage system, when the business expands and the required I/O performance increases, the I/O performance of the storage system can be improved by increasing the number of storage devices (nodes).

Cache control for the scale-out storage system is considered as one method to improve the I/O performance of the scale-out storage system. For example, a technique disclosed in Japanese Patent Application No. 2017-524248 (Patent Literature 1) is known as the cache control. As the cache control, Patent Literature 1 discloses a method of improving read performance by controlling a node to which a cache is allocated.

In general, the inter-node connection in the scale-out storage system is "loose coupling". In the present description, "loose coupling" refers to inter-node connection in which data cannot be input and output from a cache memory area (hereinafter, simply referred to as a cache area) of one node to a cache memory area of another node. In a storage system using the loose coupling, one node manages its own cache area and does not manage the cache area of another node.

Therefore, one node can allocate a storage destination cache segment (cache sub-area) of data from its own cache area and cannot allocate a cache segment from the cache area of another node. As a result, when I/O data (target data input and output according to an I/O request) is transferred between loosely coupled nodes, the I/O data is stored in a cache area of a transfer source node as well as in a cache area of a transfer destination node.

Therefore, it is considered to set the inter-node connection in the scale-out storage system to be "tight coupling". In the present description, "tight coupling" refers to inter-node connection in which the I/O data can be input and output from the cache area of one node to the cache area of another node. In a storage system using the tight coupling, one node manages not only its own cache area but also the cache area of another node. Therefore, one node can allocate a cache segment from any of the cache area of the node and the cache area of another node. As a result, when the I/O data is transferred between tightly coupled nodes, the I/O data is stored only in one of the cache area of the transfer source node and the cache area of the transfer destination node.

Thus, in the "tight coupling", there may be one cache area where a cache segment is allocated with respect to one I/O data. In a write operation, the cache segment may be duplicated (redundant). In this case, there may be one cache area where a main cache segment (front surface) is be allocated and one or more cache areas where a sub-cache segment (sub-surface) is allocated. Hereinafter, it is assumed that a scale-out storage system of "tight coupling" is used in the description.

As described above, the scale-out storage system has an advantage over a related non-scale-out storage in that the performance can be expanded. On the other hand, the number of times of copying I/O data between nodes may increase, the bandwidth of a path connecting the nodes may be a bottleneck, and the I/O performance of the storage system may be lowered. Therefore, Patent Literature 1 describes a method of determining a node (when a node includes a plurality of storage controllers (CTL), CTL) that allocates a cache using one or both of an I/O pattern and a connection form, so as to reduce the number of times of copying I/O data between the nodes, which improves read performance of the storage system.

However, Patent Literature 1 does not describe a method of improving write performance. Generally, in a storage system adopting a write-back method, write completion is notified to a host of an I/O request source when I/O data is stored in a cache memory. Therefore, a method in which the I/O data is copied and cached at two or more nodes is used until the I/O data is stored in a final storage medium such that the I/O data is not lost due to a single node failure. Therefore, the number of times of copying data between nodes is larger in a case of write compared to read and the performance is lower than the related non-scale-out storage in a case where the data path bandwidth between the nodes is a bottleneck.

On the other hand, in order to improve I/O response performance in the storage system, it is desirable to keep data accessed at high frequency in a cache as much as possible. Therefore, even when the cache is allocated to simply reduce data copying between the CTLs, data with a high cache hit rate cannot be kept in the cache at a specific node, and the response performance deteriorates due to a reduced cache hit rate. Therefore, it is an object to improve write throughput performance without causing a decrease in response performance.

SUMMARY OF THE INVENTION

According to an aspect of the invention, a storage system includes a plurality of storage nodes that communicate via a network. Each of the plurality of storage nodes includes one or more controllers. At least one controller in the controllers specifies at least two controllers that allocate a cache sub-area where write data is stored based on a controller that receives the write data from a host and a controller that processes the write date, and the cache sub-area is allocated in specified controllers.

According to the aspect of the invention, performance of the storage system is improved.

BRIEF DESCRIPTION OF THE DRAWINGS

FIG. 5 is a diagram showing a configuration example of a PDEV management table.

FIG. 6 is a diagram showing a configuration example of an LDEV management table.

FIG. 7 is a diagram showing a configuration example of a buffer segment management table.

FIG. 8 is a diagram showing a configuration example of a cache segment management table.

DESCRIPTION OF EMBODIMENTS

Figure 1:
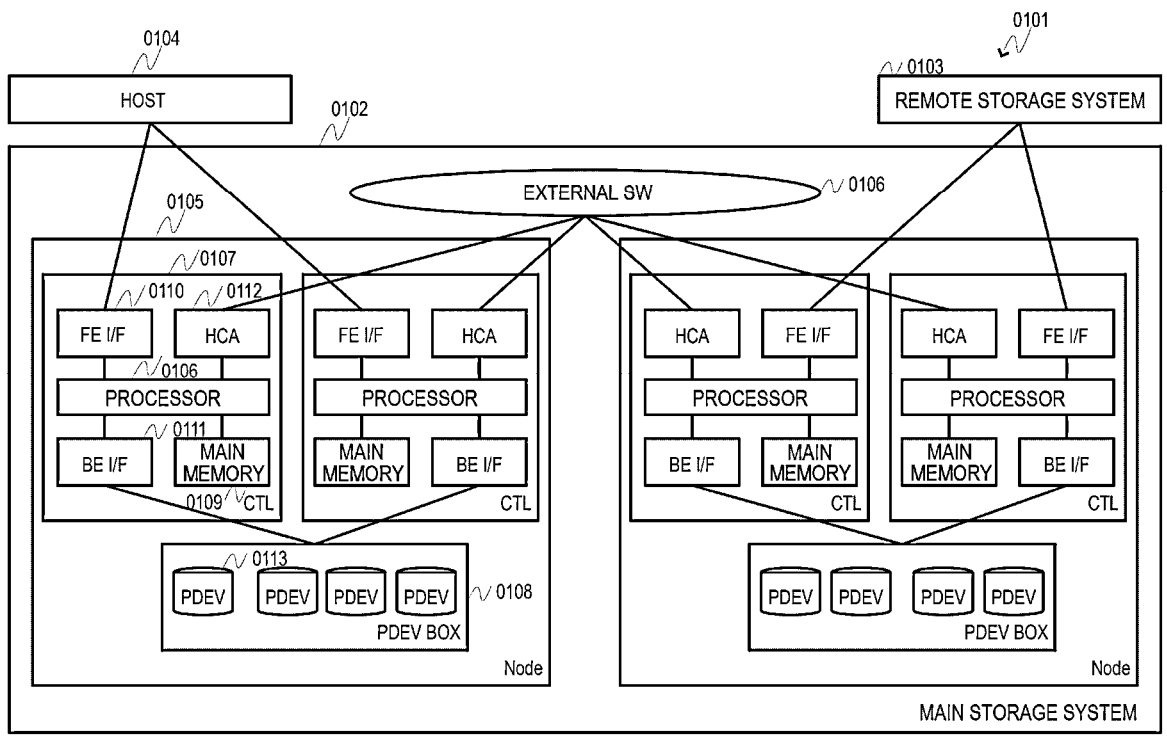
FIG. 1 is a diagram showing a configuration example of an information system including a main storage system.

Embodiments will be described below with reference to the drawings. It should be noted that these embodiments are only examples for implementing the invention and the technical scope of the invention is not limited thereto. In the following description, various kinds of information may be described in the expression of "xxx table", but the various kinds of information may be expressed with a data structure other than a table. The "xxx table" can be referred to as "xxx information" to indicate that the information does not depend on the data structure.

In the following description, although numbers are used as identification information of elements, other types of identification information (for example, name and identifier) may be used. Further, in the following description, a common reference numeral (or reference numeral) in the reference numeral may be used when elements of the same type are described without distinction, and reference numerals (or element IDs) may be used when the elements of the same type are described with distinction.

In the following description, a "main memory" may be one or more memory devices including a memory. For example, the main memory may be at least a main memory device of a main memory device (typically a volatile storage device) and an auxiliary storage device (typically a non-volatile storage device). Further, a storage unit may include at least one of a cache area (for example, a cache memory or a partial area thereof) and a buffer area (for example, a buffer memory or a partial area thereof).

In the following description, a "PDEV" refers to a physical storage device, and typically may be a non-volatile storage device (for example, an auxiliary storage device). The PDEV may be, for example, a Hard Disk Drive (HDD) or a Solid State Drive (SSD). In the following description, "RAID" is an abbreviation for Redundant Array of Independent (or Inexpensive) Disks.

A RAID group includes a plurality of PDEVs and stores data according to a RAID level associated with the RAID group. The RAID group may be referred to as a parity group. The parity group may be, for example, a RAID group that stores parity. In the following description, an "LDEV" refers to a logical storage device and includes a RAID group or a PDEV. A host executes an I/O request with respect to the "LDEV".

Hereinafter, a processing may be described by using a "program" as a subject. Since the program is executed by a processor (for example, a central processing unit (CPU)) included in a storage controller so as to execute a predetermined processing appropriately using a storage resource (for example, a main memory) and/or a communication interface device (for example, an HCA), the subject of the processing may be a storage controller or a processor. The storage controller may include a hardware circuit that executes some or all the processing. A computer program may be installed from a program source. The program source may be, for example, a program distribution server or a computer readable storage medium.

In the following description, a "host" is a system that transmits an I/O request to a storage system, and may include an interface device, a storage unit (for example, a memory), and a processor connected to the interface device and the storage unit. A host system may be configured with one or more host computers. At least one host computer may be a physical computer and the host system may include a virtual host computer in addition to a physical host computer.

Hereinafter, an example of a storage system that determines a cache destination storage device according to an I/O pattern and a connection form will be described. Generally, in the storage system, the processing of a processor is a bottleneck with regard to an I/O processing during random accessing, and a data path bandwidth (including data path bandwidth between nodes) is a bottleneck with regard to an I/O processing during sequential access. In addition, sequentially accessed data is less likely to be accessed again.

Therefore, in examples described below, during sequential write in which a data path between nodes is a bottleneck, the storage system determines a node that allocates a cache area so as to reduce the number of times of copying data between the nodes. Further in one example, the storage system releases the cache area immediately after I/O data is stored in a final storage medium. In the examples described below, the storage system determines the node that allocates the cache area so as to increase cache utilization efficiency between the nodes during random write.

It should be noted that embodiments described below do not limit the invention according to the claims, and all combinations of features described in the embodiments are not necessarily essential to the solution of the invention. For example, the storage system may determine the node that allocates the cache area so as to reduce the number of times of copying data between the nodes, as to be described later, independently of an access pattern (sequential write or random write) of a write request.

FIG. 1 is a diagram showing a configuration example of an information system 0101. The information system 0101 includes one or more main storage systems 0102, one or more remote storage systems 0103, and one or more hosts 0104. The remote storage system 0103 may not be included. Although the main storage system 0102 is directly connected to the remote storage system 0103 and the main storage system 0102 is directly connected to the host 0104 in FIG. 1, they may be connected via a network such as a Storage Area Network (SAN), a Local Area Network (LAN), and a World Area Network (WAN).

The main storage system 0102 includes one or more nodes 0105 (also referred to as storage nodes) and one or more external switches (SW) 0106. Although the nodes 0105 are connected to each other via the external SWs 0106 in FIG. 1, the nodes 0105 may be directly connected to each other.

Each of a plurality of nodes 0105 will be described by taking one node 0105 as an example. The node 0105 includes one or more storage controllers (CTL) 0107 and one or more PDEV BOXes 0108. The PDEV BOX 0108 includes one or more PDEVs 0113 and intermediates a connection between the CTL 0107 and the PDEV 0113.

Although the CTL 0107 is directly connected to the PDEV BOX 0108 in FIG. 1, the CTL 0107 may be connected to the PDEV BOX 0108 via a switch or the like. In addition, the CTL 0107 may be directly connected to the PDEV 0113 not via the PDEV BOX 0108. Further, although the CTLs 0107 in the same node 0105 are connected to each other via the external SWs 0106, the CTLs 0107 in the same node 0105 may be directly connected to each other.

Each of a plurality of CTLs 0107 will be described by taking one CTL 0107 as an example. The CTL 0107 includes a processor 0106, a main memory 0109, a Front End Interface (FE I/F) 0110, a Back End Interface (BE I/F) 0111, and a Host Channel Adapter (HCA) 0112. The number of the above elements that form the CTL 0107 may be one or more.

The processor 0106 controls the entire CTL 0107 and operates based on a microprogram stored in the main memory 0109. The FE I/F 0110 is controlled by the processor 0106 and exchanges an I/O request or I/O data with the host 0104 and the remote storage system 0103. The BE I/F 0111 is controlled by the processor 0106 and exchanges I/O data with the PDEV 0113 via the PDEV BOX 0108. The HCA 0112 is controlled by the processor 0106 and exchanges control information or I/O data with other CTLs 0107 via the external SW 0106.

In the present embodiment, the connection between the nodes 0105 is tight coupling. In a storage system using the tight coupling, a communication protocol used in communication between the nodes 0105 is the same as a communication protocol used in communication between devices (elements) in the CTL 0107. Both communication protocols are, for example, a PCI-express (PCIe).

On the other hand, in a storage device using the loose coupling, a communication protocol used in communication between nodes is different from a communication protocol used in communication between devices in the storage device. The former communication protocol is, for example, a Fibre Channel (FC) or an Internet Protocol (IP), and the latter communication protocol is, for example, a PCIe. The definitions of the tight coupling and the loose coupling are as described above.

Figure 2:
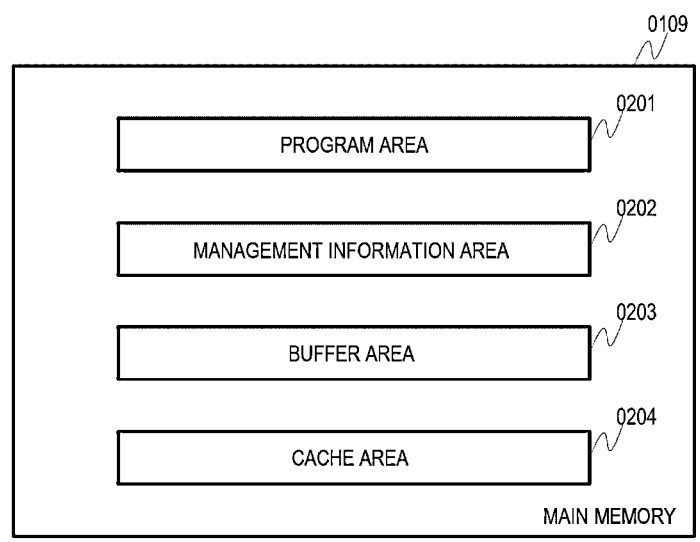
FIG. 2 is a diagram showing a configuration example of a main memory.

FIG. 2 is a diagram showing a configuration example of the main memory 0109. In the main memory 0109, a program area 0201, a management information area 0202, a buffer area 0203, and a cache area 0204 are allocated. The program area 0201 is an area where programs for the processor 0106 in the same CTL 0107 to execute the processing are stored. The management information area 0202 is an area that is accessed by all processors in the main storage system 0102 and an area where various management tables are stored.

The buffer area 0203 and the cache area 0204 are areas where data is temporarily stored and then the data is transferred by the FE I/F 0110, the BE I/F 0111, and the HCA 0112 in the same CTL 0107. The buffer area 0203 and the cache area 0204 are configured with a plurality of segments (units obtained by segmenting a cache area and also referred to as cache sub-areas), and allocate an area in unit of a segment. In addition, data read out from the buffer area 0203 does not remain in the buffer area 0203. On the other hand, data read out from the cache area 0204 remains in the cache area 0204.

Figure 3:
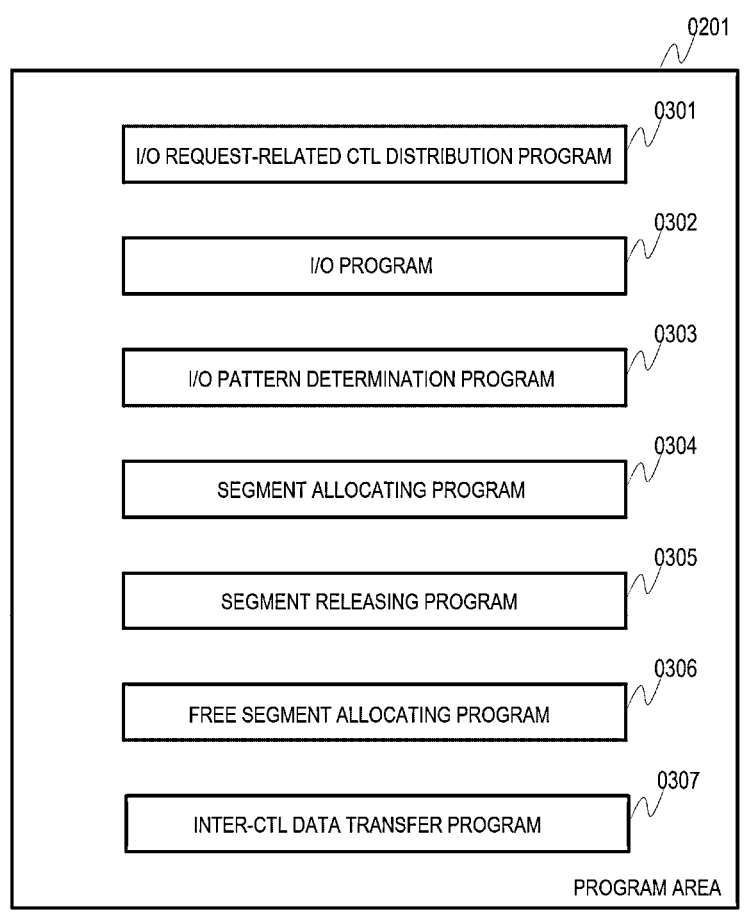
FIG. 3 is a diagram showing a configuration example of a program area.

FIG. 3 is a diagram showing an example of a program stored in the program area 0201. In the program area 0201, for example, an I/O request-related CTL distribution program 0301, an I/O program 0302, an I/O pattern determination program 0303, a segment allocating program 0304, a segment releasing program 0305, a free segment allocating program 0306, and an inter-storage-controller data transfer program 0307 are stored.

When an I/O request is received from the host 0104, the I/O request-related CTL distribution program 0301 determines and distributes a CTL 0107 that is responsible for the I/O request. The distribution may be executed in advance by determining a CTL 0107 that processes the I/O request for each LDEV, or may be dynamically determined. Next, the processor 0106 in the CTL 0107 to which the I/O request is allocated executes the I/O program 0302 to execute the corresponding processing according to the I/O request.

The I/O pattern determination program 0303 is called when, for example, the I/O program 0302 processes the I/O request, and determines whether an access pattern (access pattern or I/O pattern) of the I/O request is sequential or random. The segment allocating program 0304 is called when, for example, the I/O program 0302 processes the I/O request, and allocates a buffer segment and a cache segment. The segment releasing program 0305 is called when, for example, the I/O program 0302 processes the I/O request, and releases the buffer segment and the cache segment.

The free segment allocating program 0306 is executed asynchronously with the I/O request, and keeps an amount of a segment (free segment) in an allocable state in the buffer segment and the cache segment at a certain value or more. The inter-storage-controller data transfer program 0307 is called when, for example, the I/O program 0302 processes the I/O request, and executes data transfer between the CTLs 0107.

Figure 4:
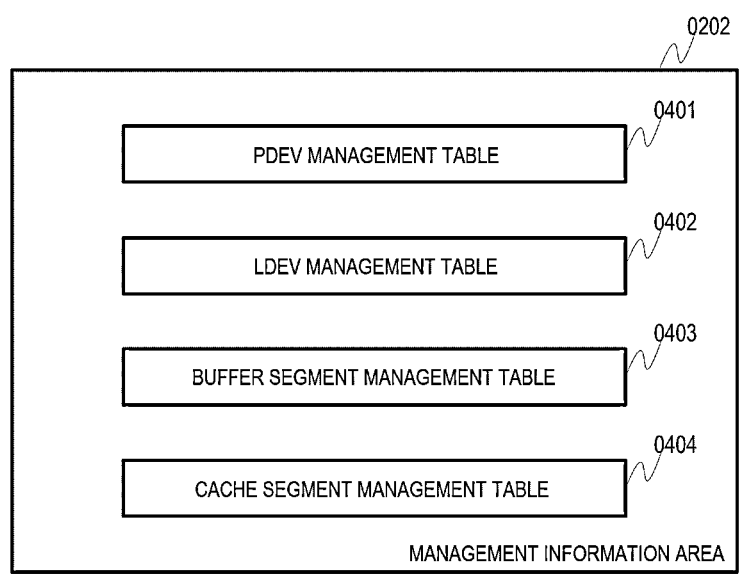
FIG. 4 is a diagram showing a configuration example of a management information area.

FIG. 4 is a diagram showing an example of information stored in the management information area 0202. In the management information area 0202, a PDEV management table 0401, an LDEV management table 0402, a buffer segment management table 0403, and a cache segment management table 0404 are stored.

The PDEV management table 0401 shows states of all PDEVs 0113 in the main storage system 102 and corresponding relationships between the PDEVs 0113 and the CTLs 0107. The LDEV management table 0402 shows corresponding relationships between the LDEVs and all PDEVs 0113 in the main storage system 102. The buffer segment management table 0403 is used to manage all buffer areas 0203 in the main storage system 102. The cache segment management table 0404 is used to manage all cache areas 0204 in the main storage system 102.

Figure 5:
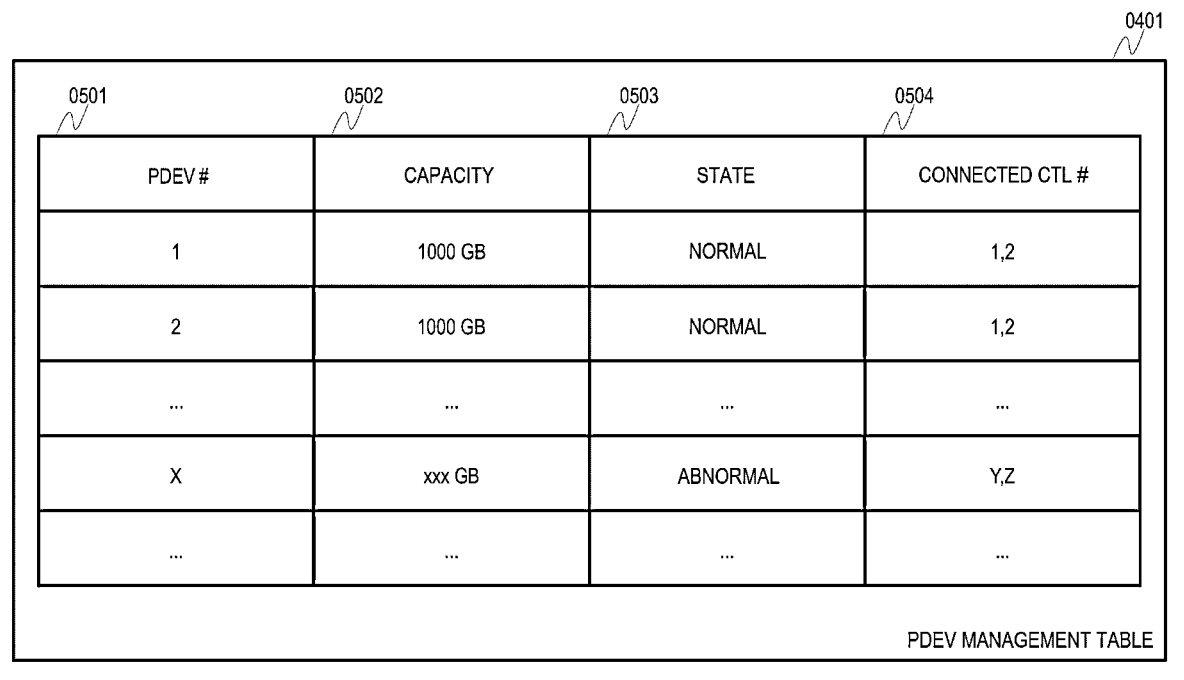

FIG. 5 is a diagram showing a configuration example of the PDEV management table 0401. The PDEV management table 0401 includes entries of PDEV #0501, capacity 0502, state 0503, and connected CTL #0504. The PDEV #0501 is an identifier of the PDEV 0113. The capacity 0502 shows a capacity capable of storing data of the PDEV 0113. The state 0503 shows whether the PDEV 0113 is in normal operation (whether there is a failure). The connected CTL #0504 shows a CTL 0107 to be accessed which is connected to the PDEV 0113.

FIG. 6 is a diagram showing a configuration example of the LDEV management table 0402. The LDEV management table 0402 includes entries of LDEV #0601, capacity 0602, state 0603, redundancy configuration 0604, and configuration information 0605.

The LDEV #0601 is an identifier of the LDEV. The capacity 0602 shows a capacity capable of storing data in an LDEV. The state 0503 shows whether I/O can be normally executed to the LDEV. The redundancy configuration 0604 shows a state of redundancy caused by RAID or storage system redundancy with the remote storage system 0103. The configuration information 0605 shows a PDEV 0113 that belongs to the LDEV, and a remote storage system 0103 corresponding to the storage system redundancy.

FIG. 7 is a diagram showing a configuration example of the buffer segment management table 0403. The buffer segment management table 0403 includes segment #0701, CTL #0702, and state 0703. The segment #0701 is an identifier of the buffer segment. The CTL #0702 is an identifier of the CTL 0107 and shows a CTL 0107 that has the right to use a buffer segment. The state 0703 shows whether a buffer segment is allocated (locked or free).

FIG. 8 is a diagram showing a configuration example of the cache segment management table 0404. The cache segment management table (0404) includes segment #0801, LDEV #0802, segment # in LDEV 0803, CTL #0804, state 0805, and attribute 0806.

The segment #0801 is an identifier of the cache segment. The LDEV # is an identifier of the LDEV. The segment # in LDEV 0803 is an identifier to uniquely determining where a cache segment is allocated in a logical address space of the LDEV. The CTL #0804 is an identifier of the CTL 0107 and shows a CTL 0107 that has the right to use a buffer segment.

The state 0805 shows states of the cache segments, "free" refers to that a cache segment is not used, "locked" refers to that a cache segment is allocated but not used, "clean" refers to that a cache segment is allocated and data is stored in the PDEV, and "dirty" refers to that a cache segment is allocated but data is not stored in the PDEV yet. The attribute 0806 shows which one of a front surface and a sub-surface of the cache segment is allocated.

Figure 9:
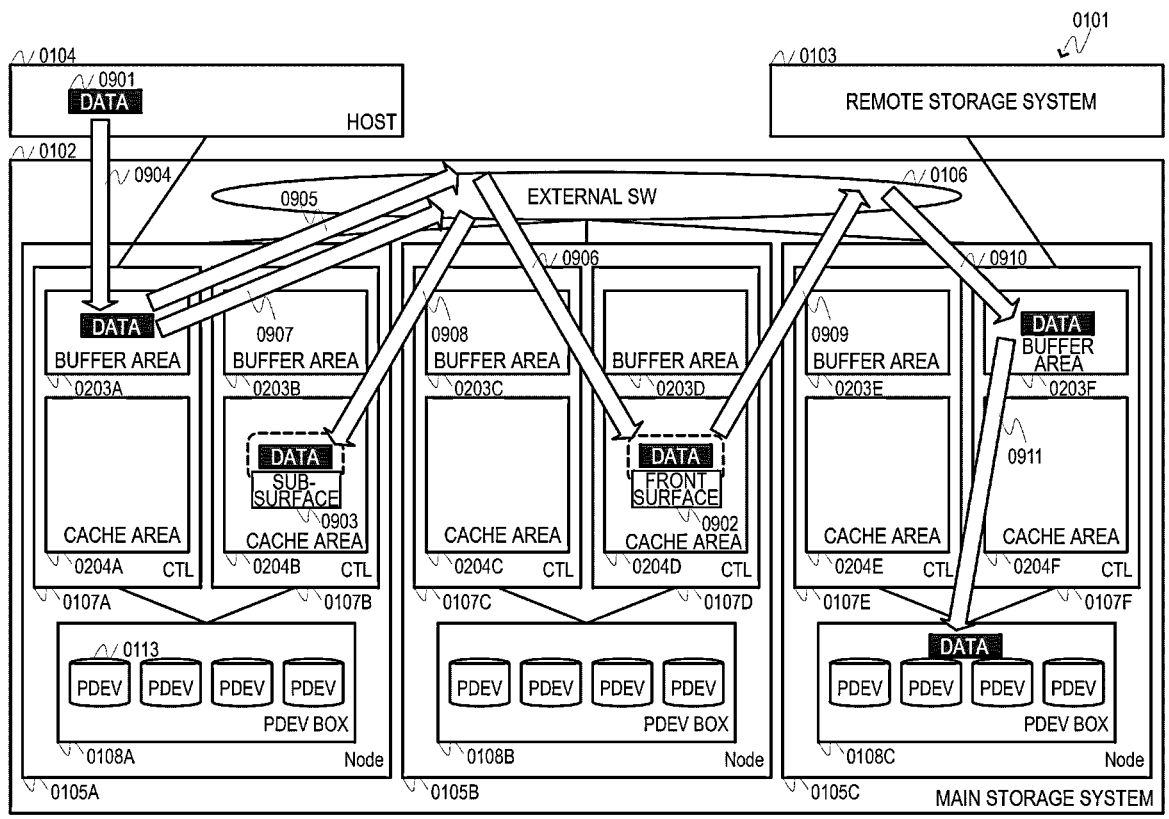
FIG. 9 is a diagram showing an example of data transfer during sequential write using a related method in the main storage system.

FIG. 9 is a diagram showing an example of a write sequence in sequential write using a related method in the main storage system 0102. In FIG. 9, in order to explain the write sequence, some components of the information system 0101 are omitted. With regard to elements that form the main storage system 0102, in addition to a four-digit serial number, one alphabetic character is added to distinguish the elements that are present in a plurality of numbers and need to be identified for explanation.

A front surface 0902 and a sub-surface 0903 of a cache segment required in a write processing are allocated in a cache area 0204B of a CTL 0107B and a cache area 0204D of a CTL 0107D, respectively. According to arrows 0904, 0905, 0906, 0907, 0908, 0909, 0910, and 0911 showing a flow of data 0901, the number of times of copying the data 0901 between CTLs is three times.

Figure 10:
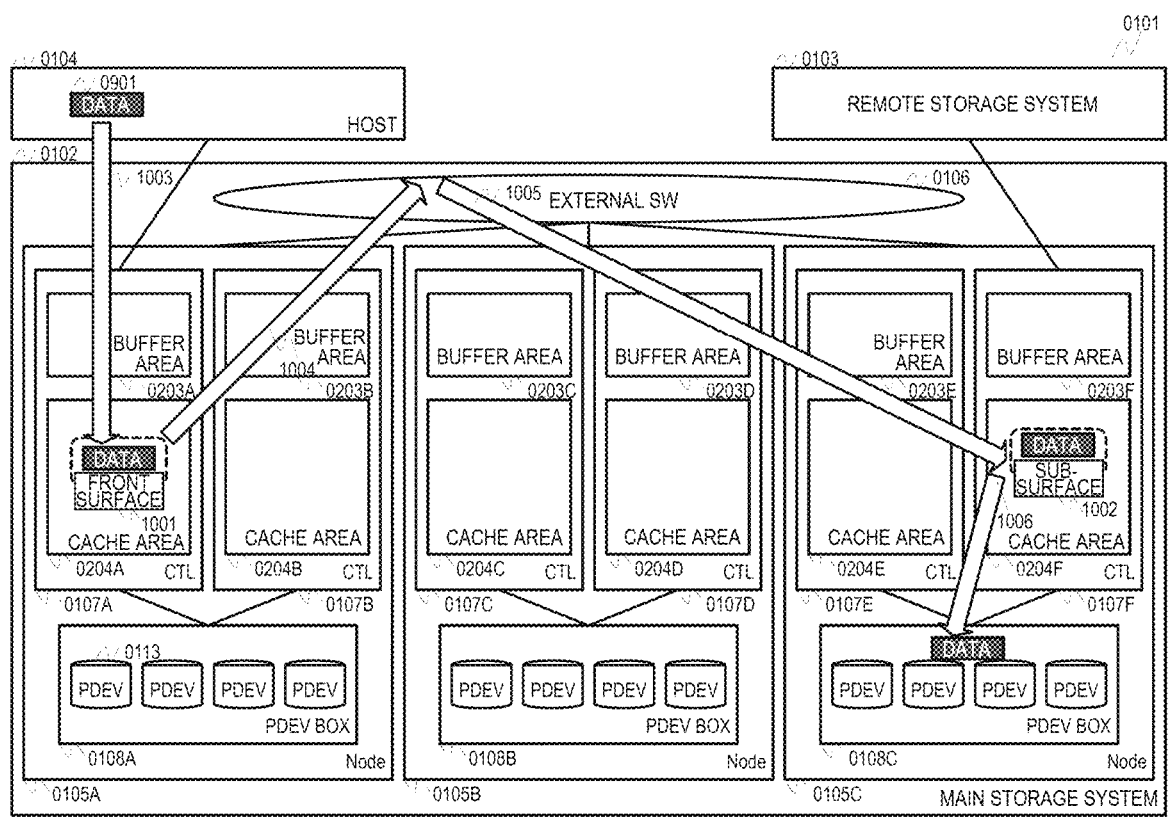
FIG. 10 is a diagram showing an example of data transfer during sequential write using a method based on the invention in the main storage system.

FIG. 10 is a diagram showing an example of the write sequence in sequential write using a method of the present embodiment in the main storage system 0102. In FIG. 10, in order to explain the write sequence, some components of the information system 0101 are omitted.

FIG. 10 is different from FIG. 9 in CTLs 0107 that allocate a front surface 1001 and a sub-surface 1002. As indicated by arrows 1003, 1004, 1005, and 1006 showing a flow of the data 0901, the number of times of copying the data 0901 between CTLs is reduced to one time from the three times in FIG. 9.

Figure 11:
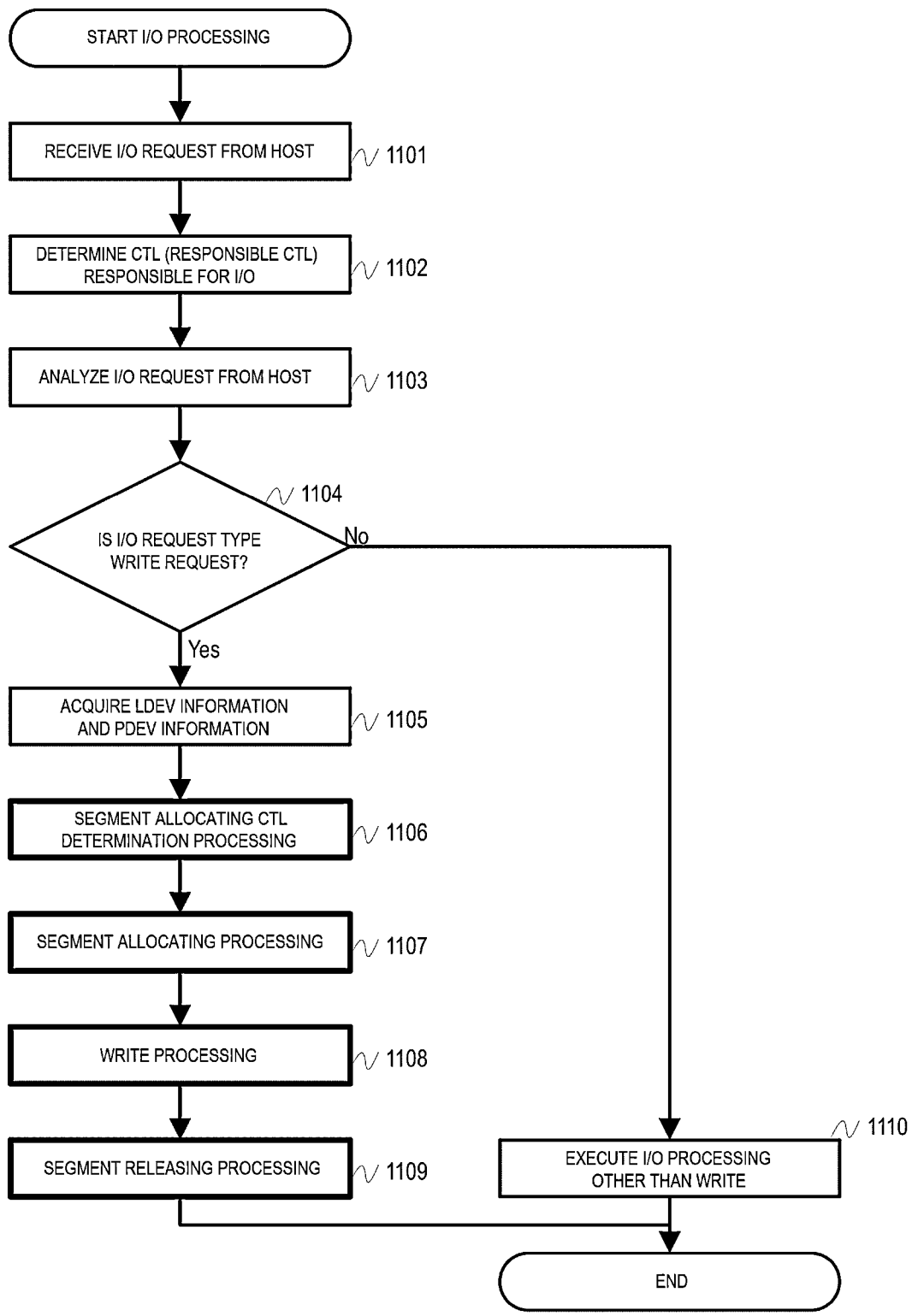
FIG. 11 is a sequence diagram showing an example of a processing flow based on an I/O request from a host in the main storage system.

FIG. 11 is a flowchart illustrating an example of a flow in which the storage system (main) 0102 processes an I/O request received from the host 0104. The CTL 0107 receives an I/O request from the host 0104 (1101). The CTL 0107 that receives the I/O request from the host 0104 determines a CTL 0107 responsible for the I/O request (hereinafter referred to as responsible CTL), and the responsible CTL 0107 continues to execute the processing (1102).

The responsible CTL 0107 analyzes the I/O request and determines an access destination LDEV, an I/O request type (read request, write request, or the like), and an access pattern (random access or sequential access). For example, it is determined to be sequential when a continuous address of the access destination is larger than a predetermined value. The access pattern may be determined by the storage system (main) by acquiring and determining a latest I/O history of each LDEV, or may be determined by acquiring hint information related to the access pattern from the host 0104 (1103).

The responsible CTL 0107 uses the I/O request type clarified in step 1103, in which the I/O request from the host 0104 is analyzed, to determine whether the I/O request type is a write request (1104). When the I/O request type is a write request (1104: Yes), the responsible CTL 0107 proceeds to step 1105 (A). On the other hand, when the I/O request type is not a write request (1104: No), the responsible CTL 0107 proceeds to step 1110 (B).

(A)

When the I/O request type is a write request (1104: Yes), the responsible CTL 0107 refers to the PDEV management table 0401 and the LDEV management table 0402 to acquire information related to an LDEV of the I/O request and information on a PDEV that forms the LDEV (1105). The responsible CTL 0107 calls a segment allocating CTL determination processing, and determines a CTL 0107 that allocates a cache segment necessary for the write processing (1106). The segment allocating CTL determination processing 1106 will be described in detail later.

The responsible CTL 0107 allocates a cache segment and a buffer segment based on a determination in the segment allocating CTL determination processing in step 1106 (1107). The segment allocating processing 1107 will be described in detail later. The responsible CTL 0107 calls a write processing and uses the segments allocated in the segment allocating processing 1107 to execute the write processing (1108). The write processing 1108 will be described in details later.

The responsible CTL 0107 calls a segment releasing processing, releases some or all of the segments allocated in the segment allocating processing 1107, and ends the processing (1109). The segment releasing processing 1109 will be described in detail later.

(B)

When the I/O request type is not a write request (1104: No), the responsible CTL 0107 executes a processing based on the I/O request (1110) and then ends the processing. Since the processing does not affect the present embodiment, a detailed description thereof is omitted.

Figure 12:
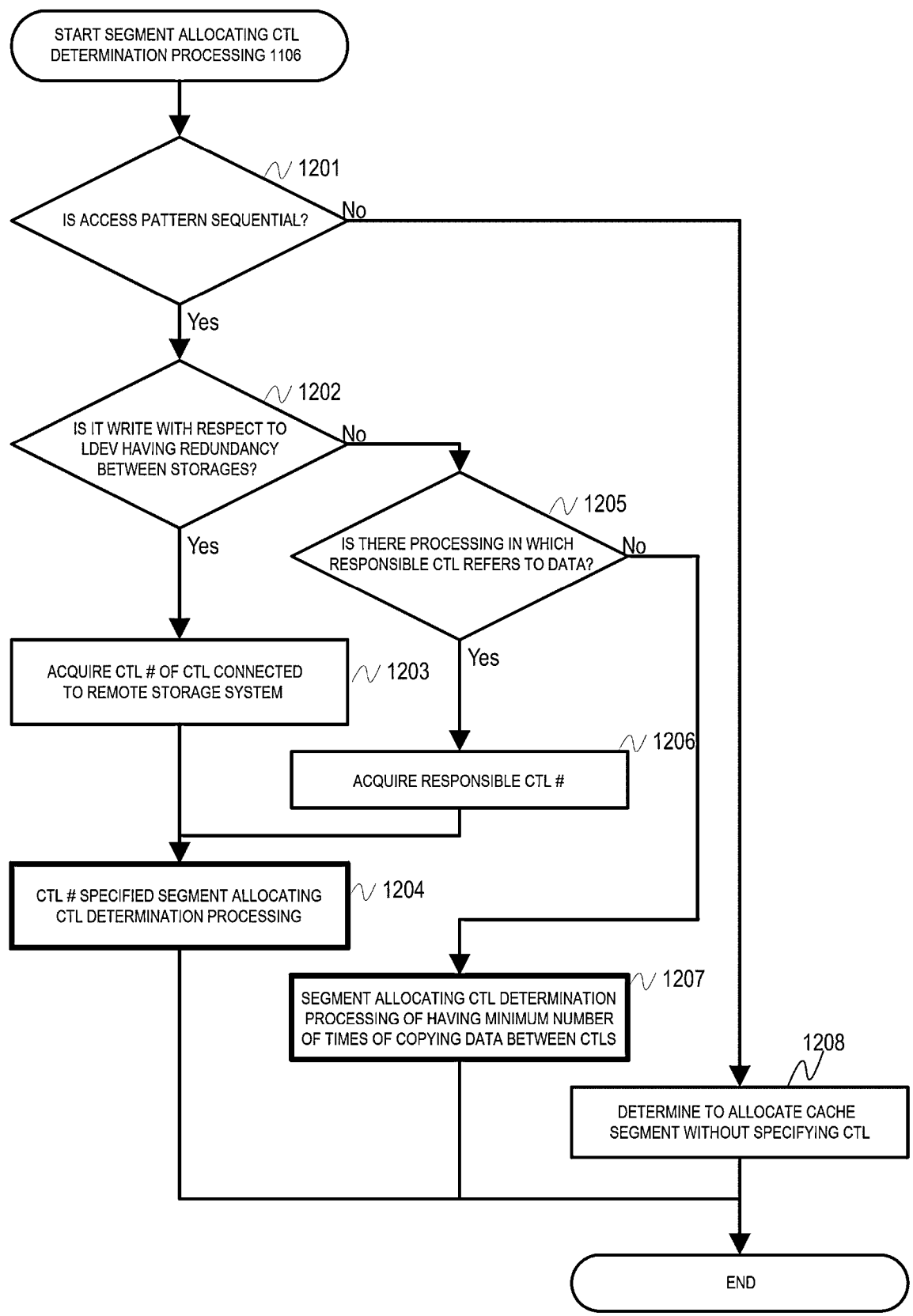
FIG. 12 is a sequence diagram showing an example of a processing of determining a storage controller that allocates a segment when a write request is being processed in the main storage system.

FIG. 12 is a flowchart showing an example of a flow of the segment allocating CTL determination processing 1106 that is called from the flow illustrated in FIG. 11. The responsible CTL 0107 refers to the access pattern clarified in step 1103 in which the I/O request from the host 0104 is analyzed, and determines whether the access pattern is sequential (1201). When the access pattern is sequential (1201: Yes), the responsible CTL 0107 proceeds to step 1202 (A). On the other hand, when the access pattern is not sequential (1201: No), the responsible CTL 0107 proceeds to step 1208 (G).

(A)

When the access pattern is sequential (1201: Yes), the responsible CTL 0107 uses the LDEV information acquired in step 1105 to determine whether it is a write with respect to a LDEV having redundancy between storages (1202). Write data with respect to the LDEV having redundancy between storages is transferred to the remote storage system 0103 by the CTL 0107 connected to the remote storage system 0103. When it is write date with respect to the LDEV having redundancy between storages (1202: Yes), the responsible CTL 0107 proceeds to step 1203 (B). On the other hand, when it is not a write with respect to the LDEV having redundancy between storages (1202: No), the responsible CTL 0107 proceeds to step 1205 (C).

(B)

When it is a write with respect to the LDEV having redundancy between storages (1202: Yes), the responsible CTL 0107 acquires a CTL # of the CTL connected to the storage controller (remote) 0103 in which the LDEV is redundant between storages (1203), and proceeds to step 1204 (E). An acquisition method may include referring to a table that is created in advance and manages connection states of storage systems, or querying all CTLs 0107 that form the storage system (main) 0102.

(C)

When it is not a write with respect to the LDEV having redundancy between storages (1202: No), the responsible CTL 0107 determines whether there is a processing (for example, a processing caused by a write such as a snapshot) in which the responsible CTL 0107 refers to data written from the host 0104 with respect to the write to the LDEV (1205). When there is a processing in which the responsible CTL 0107 refers to the data (1205: Yes), the responsible CTL 0107 proceeds to step 1206 (D). On the other hand, when there is no processing in which the responsible CTL 0107 refers to the data (1205: No), the responsible CTL 0107 proceeds to step 1207 (F).

(D)

When there is a processing in which the responsible CTL 0107 refers to the data (1205: Yes), the responsible CTL 0107 acquires a CTL # of the responsible CTL itself (1206), and proceeds to step 1204 (E).

(E)

The responsible CTL 0107 uses the CTL # acquired in step 1203 or step 1206 as an argument, calls the CTL # specified segment allocating CTL determination processing 1106, allocates the segment with a specified CTL #, then allocates a segment necessary for the write processing so as to minimize the number of times of copying data between CTLs (1204), and ends the processing. The CTL # specified segment allocating processing 1204 will be described in detail later.

(F)

When there is no processing in which the responsible CTL 0107 refers to the data (1205: No), the responsible CTL 0107 calls a segment allocating CTL determination processing of obtaining a minimum number of times of copying data between CTLs, allocates a segment necessary for the write processing so as to minimize the number of times of copying data between CTLs (1207), and ends the processing. The segment allocating CTL determination processing of having a minimum number of times of copying data between CTLs 1207 will be described in detail later.

(G)

When the access pattern is not sequential (1201: No), the responsible CTL 0107 determines to allocate a cache segment without specifying a CTL, and returns a result (1208).

Figure 13:
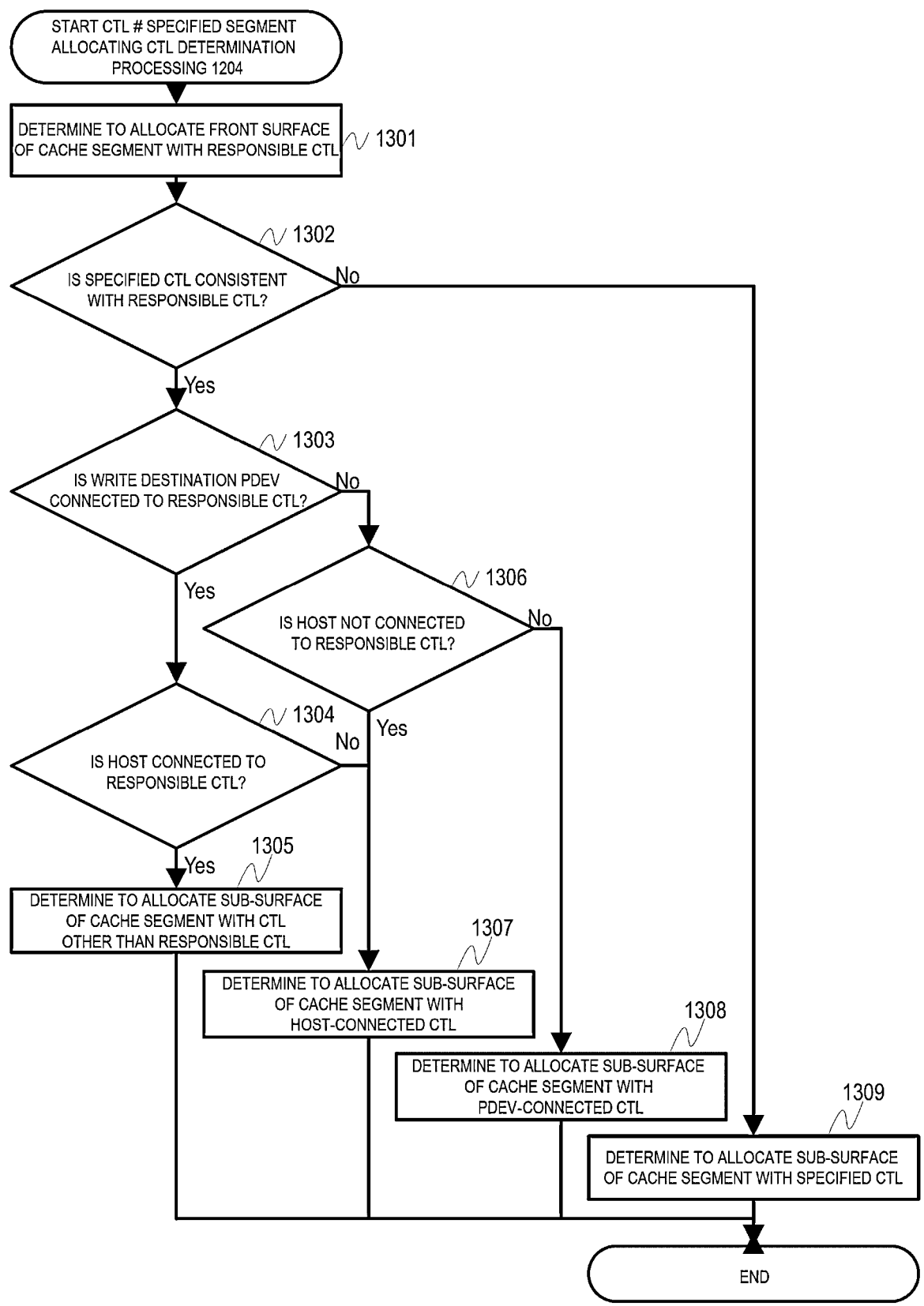
FIG. 13 is a sequence diagram showing an example of a processing of determining a storage controller that allocates a segment by specifying a specific storage controller in the main storage system.

FIG. 13 is a flowchart illustrating an example of a flow of the CTL # specified segment allocating CTL determination processing 1204 called from the flow illustrated in FIG. 12. The responsible CTL 0107 determines to allocate a front surface of a cache segment with the responsible CTL (1301).

The responsible CTL 0107 uses the specified CTL # which is used as an argument to determine whether the specified CTL is consistent with the responsible CTL 0107 (1302). When the specified CTL is consistent with the responsible CTL 0107 (1302: Yes), the responsible CTL 0107 proceeds to step 1303 (A). On the other hand, when the specified CTL is not consistent with the responsible CTL 0107 (1302: No), the responsible CTL 0107 proceeds to step 1309 (G).

(A)

When the specified CTL is consistent with the responsible CTL (1302: Yes), the responsible CTL 0107 determines whether a write destination PDEV is connected to the responsible CTL 0107 (1303). When the write destination PDEV is connected to the responsible CTL 0107 (1303: Yes), the responsible CTL 0107 proceeds to step 1304 (B). On the other hand, when the write destination PDEV is not connected to the responsible CTL (1303: No), the responsible CTL 0107 proceeds to step 1306 (D).

(B)

When the write destination PDEV is connected to the responsible CTL 0107 (1303: Yes), the responsible CTL 0107 determines whether the host 0104 is connected to the responsible CTL 0107 (1304). When the host 0104 is connected to the responsible CTL (1304: Yes), the responsible CTL 0107 proceeds to step 1305 (C). On the other hand, when the host 0104 is not connected to the responsible CTL 0107 (1304: No), the responsible CTL 0107 proceeds to step 1307 (E).

(C)

When the host 0104 is connected to the responsible CTL (1304: Yes), the responsible CTL 0107 determines to allocate a sub-surface of a cache segment with a CTL other than the responsible CTL (1305), returns a result, and ends the processing.

(D)

When the write destination PDEV is not connected to the responsible CTL (1303: No), the responsible CTL 0107 determines whether the host 0104 is not connected to the responsible CTL 0107 (1306). When the host 0104 is not connected to the responsible CTL (1306: Yes), the responsible CTL 0107 proceeds to step 1307 (E). On the other hand, when the host 0104 is connected to the responsible CTL 0107 (1306: No), the responsible CTL 0107 proceeds to step 1308 (F).

(E)

When the host 0104 is not connected to the responsible CTL (1306: Yes), the responsible CTL 0107 determines to allocate the sub-surface of the cache segment with a host-connected CTL (1307), returns a result, and ends the processing.

(F)

When the host 0104 is connected to the responsible CTL (1306: No), the responsible CTL 0107 determines to allocate the sub-surface of the cache segment with a PDEV-connected CTL (1308), returns a result, and ends the processing.

(G)

When the specified CTL is not consistent with the responsible CTL 0107 (1302: No), the responsible CTL 0107 determines to allocate the sub-surface of the cache segment with the specified CTL (1309), returns a result, and ends the processing.

As described above, when the CTL # specified segment allocating CTL determination processing 1204 is started, a CTL connected to the remote storage system or a responsible CTL is specified as a CTL that allocates the cache segment. When the CTL connected to the remote storage system is specified (1302: No), the cache segment of this CTL is allocated (1309).

When there is a processing in which the responsible CTL refers to the write data (1205: No), a cache segment of the responsible CTL is allocated (1301). For the above processing, the responsible CTL needs to copy the write data. Further, a load of allocating the cache segment of the responsible CTL is smaller than a load of allocating a cache segment of another CTL. Therefore, the number of times of copying data between CTLs can be reduced and response can be improved.

For the write of the redundancy between storages, the CTL connected to the remote storage system needs to copy write data. The write of the redundancy between storages needs a long time, and further a write completion response is transmitted to the host after the write is completed. Therefore, the number of times of copying data between CTLs can be reduced and the response can be improved by allocating the cache segment of the CTL connected to the remote storage system.

When the CTL # specified segment allocating CTL determination processing 1204 is started, a responsible CTL is specified (1302: Yes). When the responsible CTL is not connected to the PDEV (1303: No) and the responsible CTL is connected to the host (1306: No), the cache segment of the CTL connected to the PDEV is allocated (1308). The PDEV is a final storage medium of the write data and the CTL connected to the PDEV receives the write data from the host or another CTL. Therefore, the number of times of copying the write data between CTLs can be reduced.

When the CTL # specified segment allocating CTL determination processing 1204 is started, a responsible CTL is specified (1302: Yes). When the responsible CTL is not connected to the host (1304: No or 1306: Yes), the cache segment of the CTL connected to the host is allocated (1307). Since the CTL connected to the host receives the write data from the host, the number of times of copying the write data between the CTLs can be reduced.

When the CTL # specified segment allocating CTL determination processing 1204 is started, a responsible CTL is specified (1302: Yes). When the responsible CTL is connected to the PDEV (1303: Yes) and the responsible CTL is connected to the host (1304: Yes), a cache segment of a CTL other than the responsible CTL is allocated (1305). The CTL other than the responsible CTL does not need to copy the write data, and any CTL can be selected to duplicate cache data.

In a case where the CTL connected to the remote storage system is not specified when the CTL # specified segment allocating CTL determination processing 1204 is started, a CTL different from the responsible CTL may be specified in step 1301. In the above flow, the cache segment of the responsible CTL may be a sub-surface and the cache segment of another CTL may be a front surface.

Figure 14:
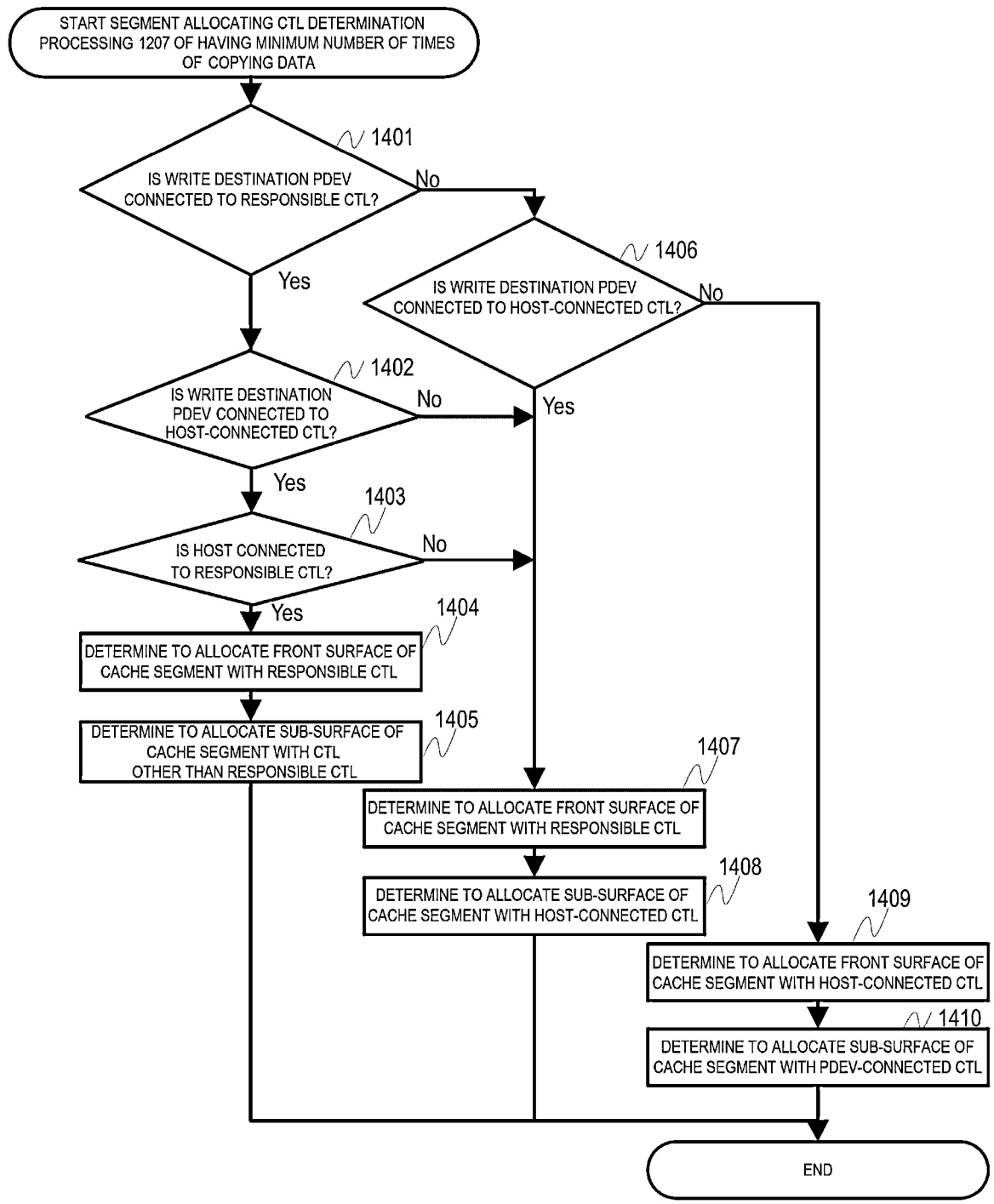
FIG. 14 is a sequence diagram showing an example of a processing of determining a storage controller that allocates a segment so as to minimize the number of times of copying data between storage controllers in the main storage system.

FIG. 14 is a flowchart illustrating an example of a flow of the segment allocating CTL determination processing of having a minimum number of times of copying data between CTLs 1207 which is called from the flow illustrated in FIG. 12.

The responsible CTL 0107 determines whether the write destination PDEV is connected to the responsible CTL 0107 (1401). When the write destination PDEV is connected to the responsible CTL 0107 (1401: Yes), the responsible CTL 0107 proceeds to step 1402 (A). On the other hand, when the write destination PDEV is not connected to the responsible CTL 0107 (1401: No), the responsible CTL 0107 proceeds to step 1406 (D).

(A)

When the write destination PDEV is connected to the responsible CTL 0107 (1401: Yes), the responsible CTL 0107 determines whether the write destination PDEV is connected to the host-connected CTL (1402). When the write destination PDEV is connected to the host-connected CTL (1402: Yes), the responsible CTL 0107 proceeds to step 1403 (B). On the other hand, when the write destination PDEV is not connected to the host-connected CTL (1402: No), the responsible CTL 0107 proceeds to step 1407 (E).

(B)

When the write destination PDEV is connected to the host-connected CTL (1402: Yes), the responsible CTL determines whether the host 0104 is connected to the responsible CTL 0107 (1403). When the host 0104 is connected to the responsible CTL 0107 (1403: Yes), the responsible CTL 0107 proceeds to step 1404 (C). On the other hand, when the host 0104 is not connected to the responsible CTL 0107 (1403: No), the responsible CTL 0107 proceeds to step 1407 (E).

(C)

When the host 0104 is connected to the responsible CTL 0107 (1403: Yes), the responsible CTL 0107 determines to allocate the front surface of the cache segment with the responsible CTL (1404). The responsible CTL 0107 determines to allocate the sub-surface of the cache segment with a CTL other than the responsible CTL (1405), returns a result, and ends the processing.

(D)

When the write destination PDEV is not connected to the responsible CTL 0107 (1401: No), the responsible CTL 0107 determines whether the write destination PDEV is connected to the host-connected CTL (1406). When the write destination PDEV is connected to the host-connected CTL (1406: Yes), the responsible CTL 0107 proceeds to step

1407 (E). On the other hand, when the write destination PDEV is not connected to the host-connected CTL (1406: No), the responsible CTL 0107 proceeds to step 1409 (F).

(E)

When the write destination PDEV is connected to the host-connected CTL (1406: Yes), the responsible CTL 0107 determines to allocate the front surface of the cache segment with the responsible CTL (1407). The responsible CTL 0107 determines to allocate the sub-surface of the cache segment with the host-connected CTL (1408), returns a result, and ends the processing.

(F)

When the write destination PDEV is not connected to the CTL connected to the host (1406: No), the responsible CTL 0107 determines to allocate the front surface of the cache segment with the host-connected CTL (1409). The responsible CTL 0107 determines to allocate the sub-surface of the cache segment with the PDEV-connected CTL (1410), returns a result, and ends the processing.

The above flow described with reference to FIG. 14 is limited to the write during the sequential access. One surface of the front surface and the sub-surface of the cache is provided in the host-connected CTL, and the other surface is provided in the PDEV-connected CTL. When one CTL is connected to the host and the PDEV, the CTL and another CTL are selected. The host-connected CTL receives the write data from the host. The PDEV-connected CTL stores the write data into the PDEV. Therefore, the number of times of copying between CTLs to duplicate the cache data can be reduced.

As described with reference to FIGS. 12, 13 and 14, each of the CTL that is connected to the remote storage system, the responsible CTL that processes the write data, the CTL that receives the write data from the host, and the CTL that stores data into the PDEV is independent of the cache of the write data, and whether the write data is received from the host or another CTL is determined for different purposes. Therefore, the above CTLs can be specified as the CTL that allocates the cache segment so as to reduce the number of times of data transfer to multi-duplicate the cache of the write data.

Figure 15:
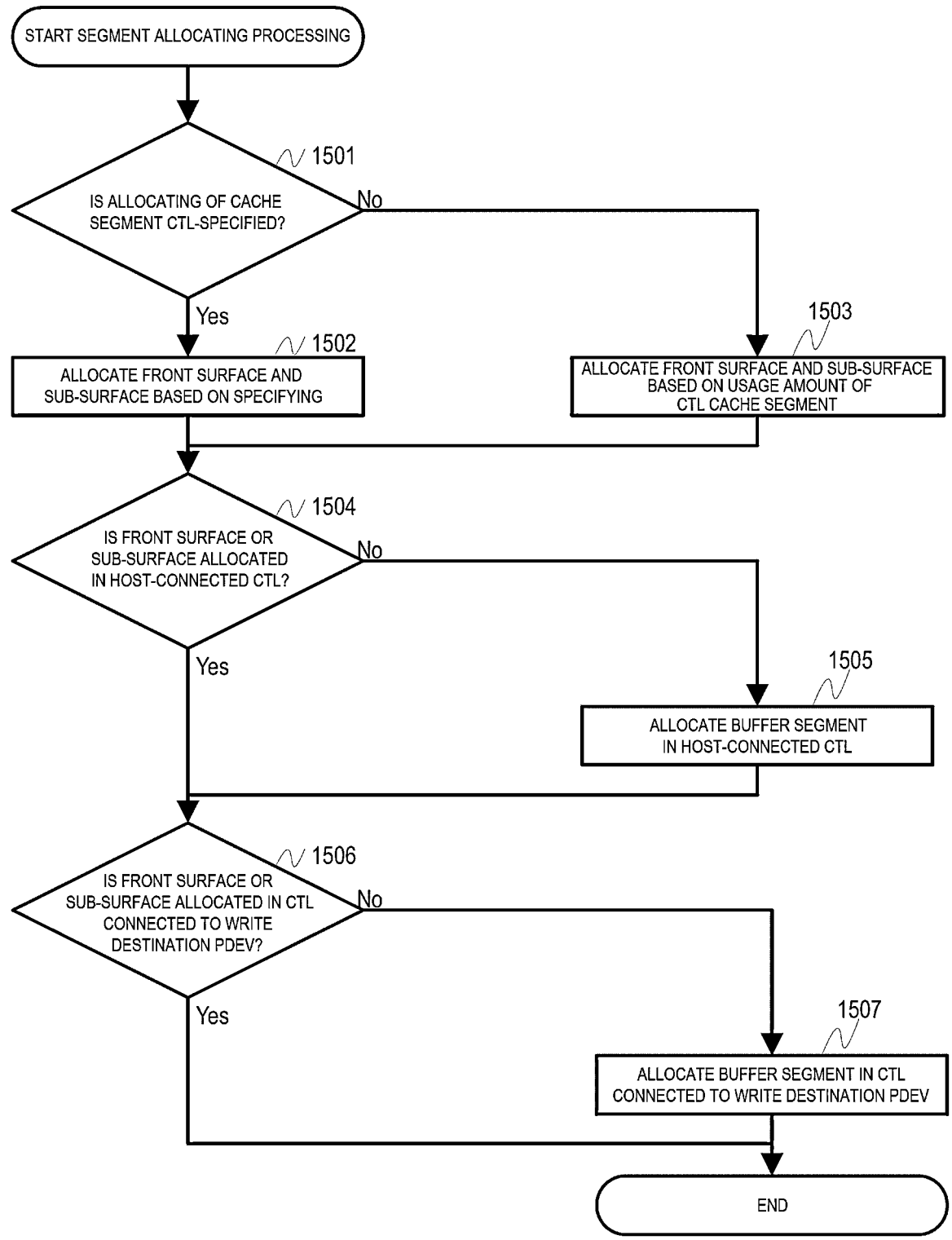
FIG. 15 is a sequence diagram showing an example of a processing of allocating a segment in the main storage system.

FIG. 15 is a flowchart illustrating an example of a flow of the segment allocating processing 1107 that is called from the flow illustrated in FIG. 11. Based on the determination in the cache segment allocating CTL determination processing 1106, the responsible CTL 0107 determines whether the cache segment is CTL-specified (1501). When the cache segment is CTL-specified (1501: Yes), the responsible CTL 0107 proceeds to step 1502 (A). On the other hand, when the cache segment is not CTL-specified (1501: No), the responsible CTL 0107 proceeds to step 1503 (B).

(A)

When the cache segment is CTL-specified (1501: Yes), the responsible CTL 0107 allocates a front surface and a sub-surface of the cache segment in a specified CTL, and the responsible CTL 0107 proceeds to step 1504 (C).

(B)

When the cache segment is not CTL-specified (1501: No), the responsible CTL 0107 calculates a usage amount of a cache segment for each CTL, allocates the front surface and the sub-surface in selected different CTLs so as to balance the usage amount between CTLs (for example, allocates the front surface and the sub-surface in an order from a CTL with a least usage amount), and proceeds to step 1504 (C). Accordingly, a cache hit rate can be increased. It should be noted that the CTL that allocates the cache segment does not necessarily have to be determined based on the usage amount of the cache segment for each CTL, and for example, a CTL that has allocated the cache segment last time may be stored and the CTL that allocates the front surface and the sub-surface may be determined by a round robin.

(C)

The responsible CTL 0107 determines whether the front surface or the sub-surface is allocated in the CTL connected to the host 0104 (1504). When the front surface or the sub-surface is allocated in the CTL connected to the host 0104 (1504: Yes), the responsible CTL 0107 proceeds to step 1506 (E). On the other hand, when the front surface or the sub-surface is not allocated in the CTL connected to the host 0104 (1504: No), the responsible CTL 0107 proceeds to step 1505 (D).

(D)

When the front surface or the sub-surface is not allocated in the CTL connected to the host 0104 (1504: No), the responsible CTL 0107 allocates a buffer segment in the CTL connected to the host 0104 (1505), and the responsible CTL 0107 proceeds to step 1506 (E).

(E)

When the front surface or the sub-surface is allocated in the CTL connected to the host 0104 (1504: Yes), the responsible CTL 0107 determines whether the front surface or the sub-surface is allocated in the CTL connected to the write destination PDEV (1506). When the front surface or the sub-surface is allocated in the CTL connected to the write destination PDEV (1506: Yes), the processing ends.

On the other hand, when the front surface or the sub-surface is not allocated in the CTL connected to the write destination PDEV (1506: No), the responsible CTL 0107 proceeds to step 1507. The responsible CTL 0107 allocates a buffer segment in the CTL connected to the write destination PDEV (1507), and ends the processing.

Figure 16:
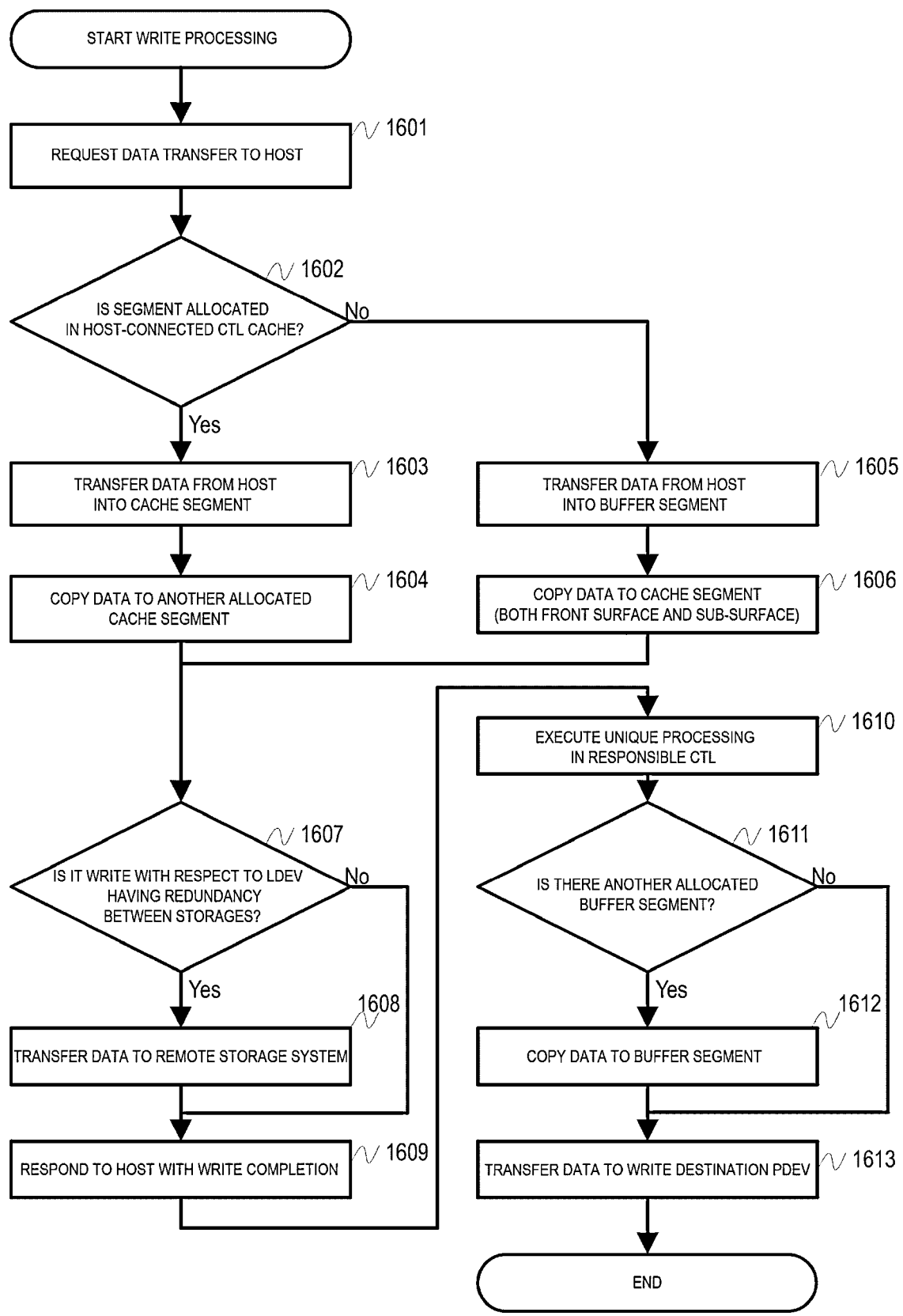
FIG. 16 is a sequence diagram showing an example of write processing in the main storage system.

FIG. 16 is a sequence diagram illustrating an example of a flow of the write processing 1108 called from the sequence illustrated in FIG. 11. In the following, the responsible CTL 0107 executes each step by issuing an instruction necessary for another CTL 0107. The responsible CTL 0107 requests data transfer to the host 0104 via the CTL 0107 connected to the host 0104 (1601).

The responsible CTL 0107 determines whether the segment allocated in the CTL 0107 connected to the host 0104 is a cache (1602). When the segment allocated in the CTL 0107 connected to the host 0104 is a cache (1602: Yes), the responsible CTL 0107 proceeds to step 1603 (A). On the other hand, when the segment allocated in the CTL connected to the host 0104 is not a cache (is a buffer segment) (1602: No), the responsible CTL 0107 proceeds to step 1605 (B).

(A)

When the segment allocated in the CTL 0107 connected to the host 0104 is a cache (1602: Yes), the responsible CTL 0107 stores I/O data transferred from the host 0104 into the cache segment (1603). The responsible CTL 0107 copies the I/O data to a cache segment that is not the cache segment where the data is stored in step 1603 (1604), and the responsible CTL 0107 proceeds to step 1607 (C).

(B)

When the segment allocated in the CTL connected to the host 0104 is a buffer segment (1602: No), the responsible CTL 0107 stores the I/O data transferred from the host 0104 into the buffer segment (1605). The responsible CTL 0107 copies the I/O data to both the front surface and the sub-surface of the cache segment (1606), and the responsible CTL 0107 proceeds to step 1607 (C).

(C)

The responsible CTL 0107 determines whether it is a write with respect to a LDEV having storage redundancy (1607). When it is a write with respect to the LDEV having storage redundancy (1607: Yes), the responsible CTL 0107 proceeds to step 1608 (D). On the other hand, when it is not a write with respect to the LDEV having storage redundancy (1607: No), the responsible CTL 0107 proceeds to step 1609 (E).

(D)

When it is a write with respect to the LDEV having storage redundancy (1607: Yes), the responsible CTL 0107 transfers the I/O data from the CTL 0107 connected to the remote storage system 0103 (1608).

(E)

When it is not a write with respect to the LDEV having storage redundancy (1607: No), the CTL 0107 responds to the host 0104 with write completion (1609). The responsible CTL 0107 executes a unique processing in the responsible CTL 0107 (1610). For example, when it is a processing related to a snapshot and a RAID group is configured, the responsible CTL 0107 generates parity.

The responsible CTL 0107 determines whether there is another allocated buffer segment (1611) in addition to the buffer segment where data is copied in the above-described processing. When there is another allocated buffer segment (1611: Yes), the responsible CTL 0107 proceeds to step 1612 (F). On the other hand, when there is no another allocated buffer segment (1611: No), the responsible CTL 0107 proceeds to step 1613 (G).

(F)

When there is another allocated buffer segment (1611: Yes), the responsible CTL 0107 stores the I/O data transferred from the host 0104 into the buffer segment (1612), and the responsible CTL 0107 proceeds to Step 1613 (E).

(G)

The responsible CTL 0107 transfers the I/O data transferred from the host 0104 to the write destination PDEV (1613), and ends the processing.

Figure 17:
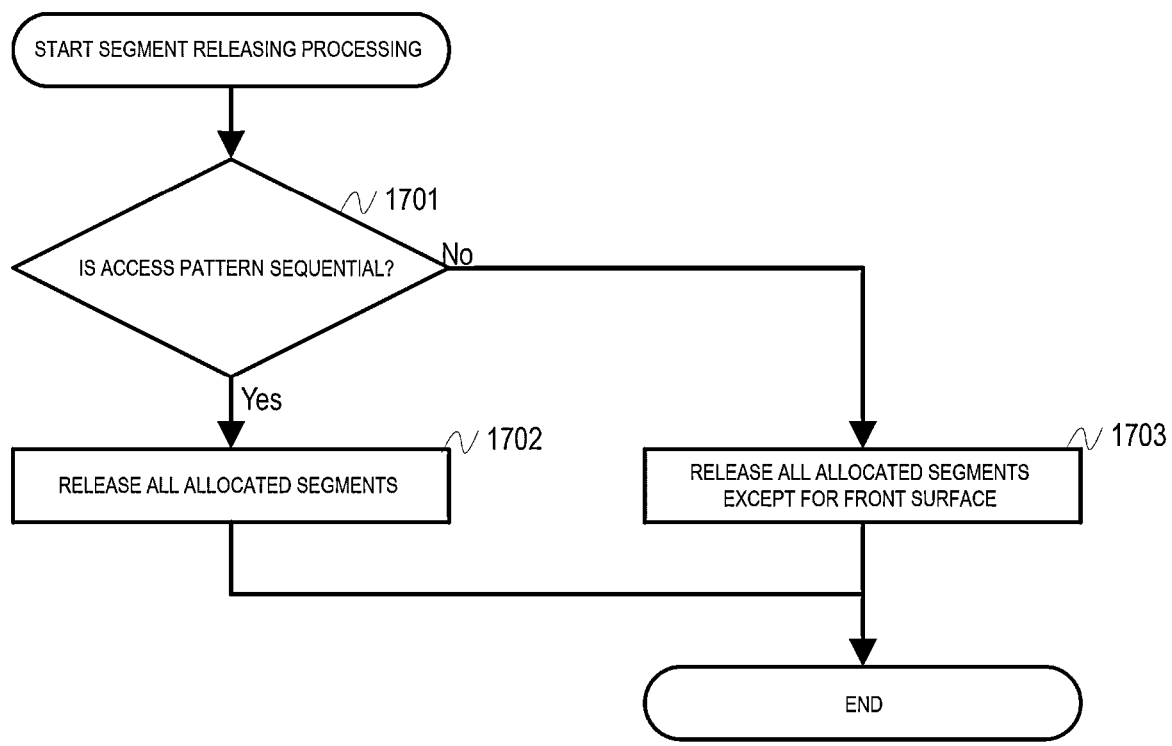
FIG. 17 is a sequence diagram showing an example of a processing of releasing a segment in the main storage system.

FIG. 17 is a flowchart illustrating an example of a flow of the segment releasing processing 1109 that is called from the flow illustrated in FIG. 11. The responsible CTL 0107 determines whether an access pattern of the I/O is sequential (1701). When the access pattern of the I/O is sequential (1701: Yes), the responsible CTL 0107 releases all allocated cache segments and buffer segments (1702), and ends the processing.

Thus, when the access pattern is sequential, all allocated cache segments are released in response to the completion of the write processing 1108 (store of the write data into the final storage medium). The sequentially accessed data is less likely to be accessed again, and the cache area can be efficiently used.

On the other hand, when the access pattern of the I/O is not sequential (1702: No), the responsible CTL 0107 releases the sub-surface of allocated cache segments except for the front surface and all allocated buffer segments (1703), and ends the processing. Accordingly, the cache hit rate can be increased.

As described above, the storage system specifies at least two controllers to allocate a cache sub-area where the write data is stored based on the controller that receives the write data from the host and the controller that processes the write data. The storage system further specifies the two controllers based on a fact whether a storage node to which each controller belongs is connected to a storage device that stores the write data.

Specifically, in the above example, CTL candidates specified as the CTL that allocates the cache segment include a CTL (if present) that transfers the write data to the remote storage system, a responsible CTL (if present) that processes the write data, a CTL that receives the write data from the host, and a CTL that stores the write data into the PDEV.

Some of the CTL candidates may be omitted. For example, both or one of the CTL (if present) that transfers the write data to the remote storage system and the responsible CTL (if present) that processes the write data may be omitted, or both or one of the CTL that receives the write data from the host and the CTL that stores the write data into the PDEV may be omitted. In a case where there is one CTL candidate, the CTL candidate may be constantly specified to allocate the cache segment. Although a maximum of two CTLs are specified in the above example, a maximum of three or more CTLs may be specified in other examples.

The priority of a specified CTL candidate may be determined according to design. In the above example, the CTL (if present) that transfers the write data to the remote storage system and the responsible CTL (if present) that processes the write data are preferably selected compared to the CTL that receives the write data from the host and the CTL that stores the write data into the PDEV. Other examples may have a different priority of the candidates.

The invention is not limited to the embodiments described above, and includes various modifications. For example, the embodiments described above have been described in detail for easy understanding of the invention, and the invention is not necessarily limited to those including all the configurations described above. Further, a part of the configuration of one embodiment can be replaced with the configuration of another embodiment, and the configuration of another embodiment can be added to the configuration of one embodiment. In addition, a part of the configuration of the embodiment may be added, deleted, or replaced with another configuration.

Each of the configurations, functions, processing units, and the like described above may be partially or entirely implemented by hardware such as through design using an integrated circuit. The configurations, functions, and the like may also be implemented by software by means of interpreting and executing a program, by a processor, for implementing their respective functions. Information such as a program, a table, or a file for implementing each function can be placed in a recording device such as a memory, a hard disk, a Solid State Drive (SSD), or a recording medium such as an IC card or an SD card. Further, control lines and information lines show those considered to be necessary for the description, and not all the control lines and the information lines are necessarily shown on the product. In practice, it may be considered that almost all the configurations are connected to each other.

What is claimed is:

1. A storage system, comprising:
    a plurality of storage nodes that communicate via a network,
    wherein each of the plurality of storage nodes includes one or more controllers and is connected with storage devices for storing data,
    wherein at least one controller of the controllers specifies at least two controllers that allocate a cache sub-area where write data is stored based on a controller that receives the write data from a host and a controller that processes the write data,
    wherein the cache sub-area is allocated in the specified controllers, wherein in a case where the controller that processes the write data refers to data stored in a storage device for processing the write data, the controller that processes the write data is included in the at least two controllers, wherein, in a case where an access pattern of a write request from the host is sequential, the at least one controller specifies the at least two controllers based on a condition that the controller that processes the write data refers to the data stored in the storage device for processing the write data, and wherein, in a case where an access pattern of the write request from the host is random, the at least one controller specifies the at least two controllers based on a cache utilization efficiency.

2. The storage system according to claim 1, wherein, in a case where the controller that processes the write data is included in the at least two controllers and the controller that processes the write data is not connected with the host, a controller connected with the host is included in the at least two controllers.

3. The storage system according to claim 2, wherein, in a case where the controller that processes the write data is included in the at least two controllers and the controller that processes the write data is connected with the host, a controller directly connected with storage devices to store the write data is included in the at least two controllers.

4. The storage system according to claim 1, wherein, in a case where the controller that processes the write data is not required to refer to data stored in a storage device for processing the write data, a controller connected with the host and a controller directly connected with storage devices to store the write data are included in the at least two controllers.

5. The storage system according to claim 1, wherein the storage system is connected with a second storage system, and wherein, in a case where the write data is made redundant between the storage systems, a controller directly connected with the second storage system is included in the at least two controllers.

6. A control method in a storage system that includes a plurality of storage nodes communicating via a network, each of the plurality of storage nodes includes one or more controllers and is connected with storage devices for storing data, the control method comprising:

specifying, with at least one controller of the controllers, at least two controllers that allocate a cache sub-area where write data is stored based on a controller that receives the write data from a host and a controller that processes the write data, allocating the cache sub-area in the specified controllers, and in a case where the controller that processes the write data refers to data stored in a storage device for processing the write data, the controller that processes the write data is included in the at least two controllers, wherein, in a case where an access pattern of a write request from the host is sequential, the at least one controller specifies the at least two controllers based on a condition that the controller that processes the write data refers to the data stored in the storage device for processing the write data, and wherein, in a case where an access pattern of the write request from the host is random, the at least one controller specifies the at least two controllers based on a cache utilization efficiency.

* * * * *